United States Patent Office 3,442,383
Patented May 6, 1969

3,442,383
SUPERCHARGED FILTER
Nils O. Rosaen, Bloomfield, Borje O. Rosaen, Ann Arbor, and Oscar E. Rosaen, Grosse Pointe, Mich., assignors, by mesne assignments, to Parker-Hannifin Corporation, Cleveland, Ohio, a corporation of Ohio
Filed Nov. 16, 1966, Ser. No. 594,793
Int. Cl. B01d 35/12, 27/10, 29/38
U.S. Cl. 210—91                        17 Claims

ABSTRACT OF THE DISCLOSURE

A filter device constructed to permit continued operation of the system to which the device is connected while permitting the filter element to be removed for cleaning or replacement and including pump apparatus operable to supercharge the fluid at the intake of the filter housing to insure at all times a proper fluid level therein. The filter housing includes a lower portion having an inlet, an outlet and a filter element intermediate said inlet and outlet and an upper tubular portion throughwhich said element may be removed.

---

A number of prior art fluid filter devices have disclosed means permitting removal of the filter element for cleaning or replacement of the filter during continuous operation of the fluid system. Generally the prior art devices include a valve in the system operable to close off portions of the filter device and redirect the fluid directly from the inlet to the outlet of the device. Such valve means add considerable cost to the manufacture of the filter device in addition to being subject to malfunction. Other disadvanages of such prior art devices manifest themselves when the valve becomes worn or when they malfunction without advance warning so that removal of the filter element from the open end of the device results in fluid spillage requiring a messy and time-consuming clean-up operation.

Another problem associated with prior art devices results from the capturing of air in the filter device and cavitation which is the result of reduced fluid pressures in the system and caused by vaporization of the fluid. In either situation, the bubbles of air or the bubbles of vaporized fluid are delivered to the primary pump in the system and cause the pump to become vapor-bound, thereby producing a drop in efficiency, as well as producing vibration, noise and destruction of the pump impeller and casing walls.

The present invention obviates the aforementioned problems in prior art devices by providing a fluid filter device which permits continuous operation of the fluid system while the filter element is removed for cleaning or replacement and further insures that the fluid level in the system never drops to a level where bubbles of air may be captured in the system by providing means for pressurizing the fluid to maintain a sufficient level and at the same time maintaining a sufficient fluid pressure in the section side of the primary pump so that cavitation cannot occur.

The preferred embodiment of the present invention, which will be subsequently described in greater detail, takes the form of a housing section defining a filter chamber having an inlet and an outlet and means for disposing a filter element in the chamber intermediate the inlet and the outlet. A tubular section forming an upward extension of the housing and having an upper end terminating above the upper fluid level of the system, provides means so that the filter element may be withdrawn or inserted into the filter chamber without interrupting the normal fluid flow to the system.

A supercharging pump preferably taking the form of an impeller rotatingly mounted in the fluid system on the inlet side of the filter element increases the pressure of the fluid at the inlet of the filter to a level such that the normal fluid level within the device never falls below the outlet to capture air and also insures that sufficient pressure is maintained in the system to prevent air entering the filter. The pump also tends to force air which is normally entrapped in the fluid to rise to the surface and thus produces a removal of such air from the fluid.

It is therefore an object of the present invention to improve the operation of those fluid systems having a continuous flow filter device connected therein by providing means for supercharging the fluid being drawn through the filter element by the primary pump of the system.

It is another object of the present invention to prevent primary pump cavitation in those fluid systems in which the filter element is disposed within a chamber having an upwardly directed extension above the fluid level of the system permitting insertion and withdrawal of the filter element into the filter chamber while permitting continuous fluid flow through the device by providing a supercharger pumping means disposed intermediate the fluid reservoir and the inlet side of the filter.

Still other objects and advantages of the present invention will readily be apparent to one skilled in the art to which the invention pertains upon reference to the following detailed description. The description makes reference to the accompanying drawings in which like reference characters refer to like parts throughout the several views and in which.

Description

Figure 1:
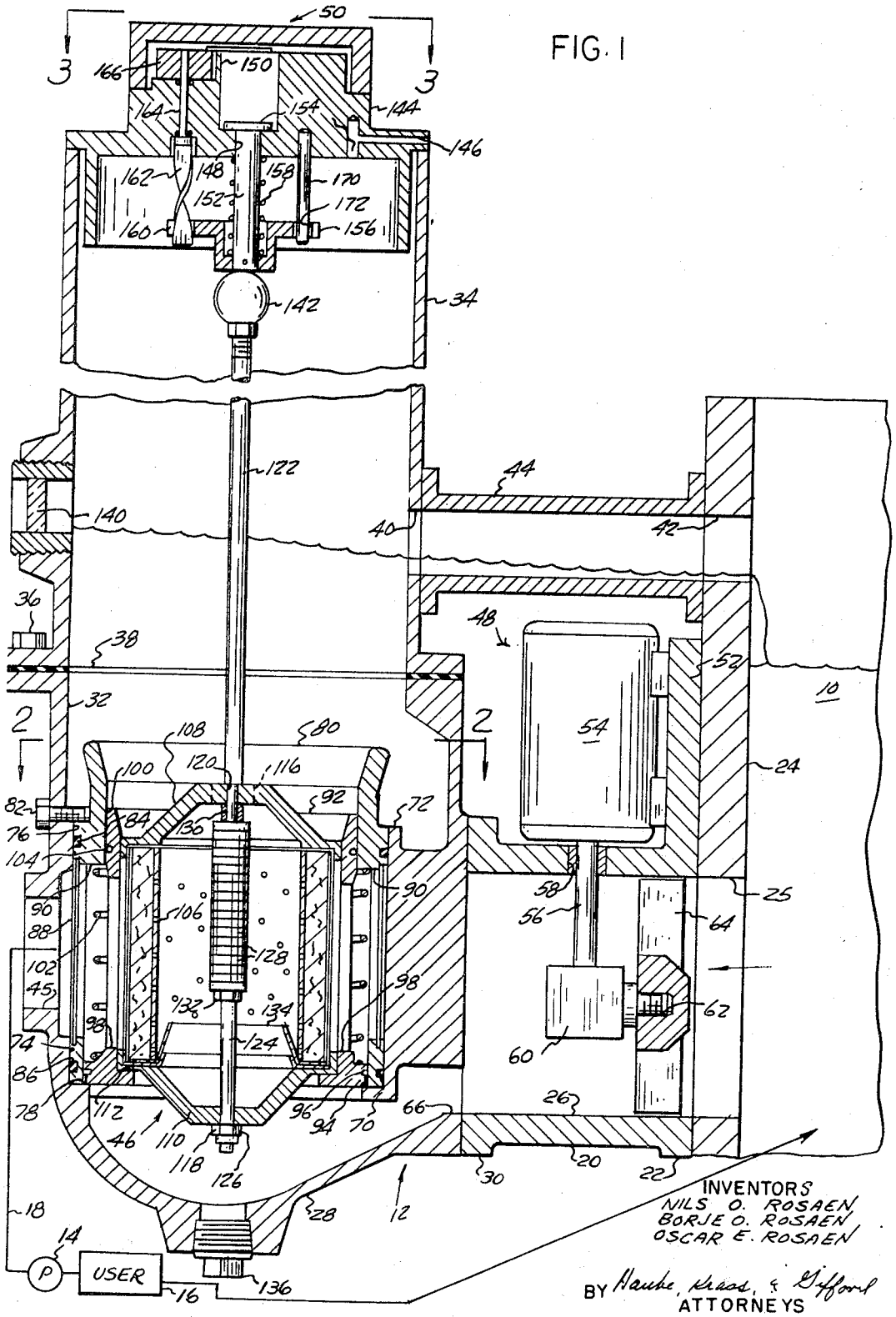
FIGURE 1 is a longitudinal cross-sectional view of a preferred combination pump-filter illustrating the present invention and with other components of a preferred fluid system connected to the pump-filter device shown diagrammatically.

Now referring to the drawings for a more detailed description of the invention, a preferred fluid system is illustrated in FIGURE 1 as comprising a fluid reservoir 10, a combination pump-filter device generally indicated at 12, a primary pump 14 and a fluid user 16. The pump-filter 12, the pump 14 and the fluid user 16 are connected by a conduit 18.

The pump-filter device 12 comprises an inlet housing 20 having a peripheral flange 22 mounted to the exterior surface of the wall 24 of the reservoir 10. A reservoir outlet opening 25 provides fluid communication through a fluid passage 26 defined in housing 20 to a filter housing 28. Housing 28 is supported on a flange 30 provided on the outer end of the inlet housing 20 by a plurality of threaded fasteners 31. The fluid passage 26 preferably has a circular cross section.

The filter housing 28 is cored to define an open top chamber 32. A tubular housing 34 having its lower end connected to the open top of the housing 28 by a plurality of threaded fasteners 36 forms a vertical upward extension of the chamber 32. A gasket 38 is disposed between the mating surfaces of the tubular extension 34 and the filter housing 28 to provide a fluid tight seal. An overflow opening 40 is provided in the tubular housing 34 at a height above the normal level of the fluid contained within the reservoir 10 and is fluidly connected to an opening 42 provided at a similar height in the reservoir wall 24 by a conduit 44. The housing 28 has a discharge opening 45 which provides an outlet for the filtered fluid.

As thus far described, the normal fluid flow in the system is as follows:

Fluid is withdrawn from a reservoir 10 through the inlet housing 20 and into the filter housing 28. A filter apparatus 46 in housing 28 removes foreign matter from the fluid which is then delivered through the conduit 18 to the suction side of the pump 14. The fluid pressure is increased between the reservoir 10 and the filter apparatus 46 by pressure producing means generally indicated at 48. The filtering condition of the filter apparatus 46 is visually shown by indicating apparatus generally indicated at 50.

Now considering in detail the pressure producing means 48, the inlet housing 20 is provided with a pad section 52 serving as a mounting base for a motor 54. The motor is connected to a source of electrical energy (not shown) and has an output shaft 56 extending through a sealed opening 58 in the inlet housing 20. A right angle drive operably connected to the output shaft 56 has a rotatable output member 62 supported for rotation about the longitudinal axis of the fluid passage 26.

An impeller 64 is rotatably carried by the output member 62 to impart pressure energy to the system fluid. It is to be understood that although a centrifugal type impeller has been illustrated, a propeller type rotor means having blades adapted to increase the pressure of the system fluid may be employed.

A substantially U-shaped inlet opening 66 connects inlet passage 26 with a lower chamber section 68.

A substantially U-shaped inlet opening 66 connects inlet passage 26 with a lower chamber section 68.

Figure 2:
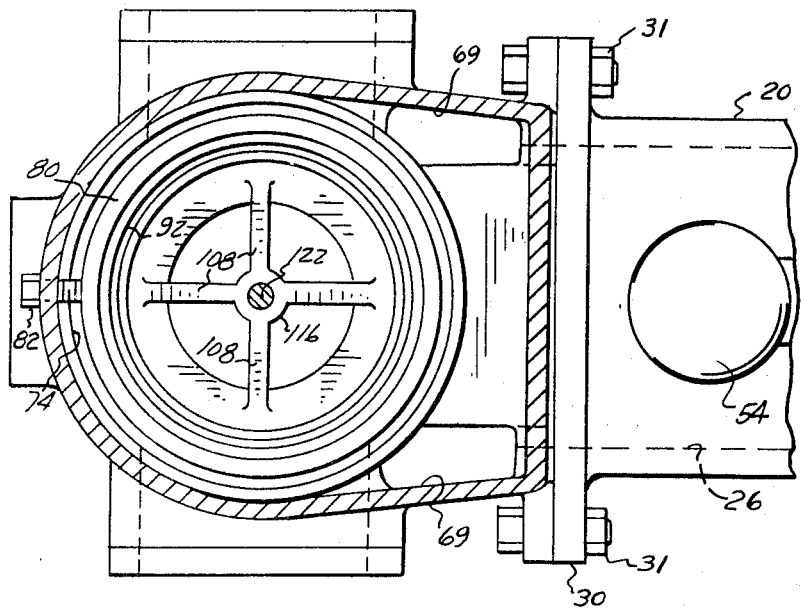
FIGURE 2 is a sectional view taken along lines 2—2 of FIGURE 1.

As can best be seen in FIGURE 2, the inlet passage is fluidly connected with the upper section of the chamber 32 through a pair of substantially vertical passages 69. A lower annular rib 70 and an upper annular rib 72 define a lower guideway 74 and an upper annular guideway 76. The guideways 74 and 76 have a similar diameter and are formed on a common vertical axis preferably corresponding to the axis of the tubular extension housing 34.

The lower edge of the annular rib 70 terminates in an annular seat 78. An outer cylindrical member 80 having a circumference corresponding to the circumference of the lower and upper guideways 74 and 76 is disposed within the filter housing 28 with its lower end resting on the seat 78. A hold-down bolt 82 carried by the housing 28 retains the cylindrical member 80 in its seated position. The cylindrical member 80 is provided with an upper O-ring 84 and a lower O-ring 86 which sealingly engage the upper guideway 76 and the lower guideway 74 respectively.

A cylindrical filtering mesh element 88 is carried in a circumferential recess provided in the member 80. The cylindrical member 80 is further provided with a plurality of circumferential apertures 90 which provide fluid communication between the exterior and the interior of the member 80.

A cylindrical carrier member 92 having a lower end enlarged to form a circumferential flange 94 is also normally disposed on the seat 78. The flange 94 carries a piston ring 96 which slidably engages the inner surface of the lower end of the cylindrical member 80. The carrier member 92 is provided with a series of circumferential openings 98 which permit fluid communication between the interior and exterior sides of the carrier member.

Normally the outer cylindrical member 80 is stationary relative to the filter housing 28. The carrier member 92 is axially slidably movable up and down within the cylindrical member 80. The cylindrical member 80 is provided with a narrowed inner circumference near its upper end to provide an upper guideway 100 for the carrier member 92 and an annular seat for the upper end of a coil spring 102 which is disposed between the carrier member 92 and the cylindrical member 80. The spring 102 is disposed such that its lower end abuts the flange 94 of the carrier member 92 so that the carrier member 92 is normally biased downwardly against the seat 78.

The upper circumferential surface of the carrier member 92 is provided with an upper piston ring 104 which bears against the guideway 100 and cooperates with the lower piston ring 96 to guide the carrier member 92 for vertical sliding movement within the outer cylindrical member 80.

A cylindrical filter element 106, sandwiched between an upper cap member 108 and a lower cap member 110, is axially slidably disposed within the carrier member 92 and rests on a narrowed section of the carrier member 92 defining a seat 112 for the lower cap member 110. The upper cap member 108 has a plurality of apertures 116 providing fluid communication between the interior of the filter element 106 and the upper section of the filter chamber 32. Similarly the lower cap member 110 has a plurality of apertures 117 providing fluid communication between the lower chamber section 68 and the interior of the filter element 106.

The lower cap member 110 is provided with an axial opening 118 which is formed on the axis of the filter element 106. The upper cap member 108 is provided with an axial opening 120 which is vertically axially aligned with the opening 118 in the lower member 110. A rod 122 having a reduced diameter threaded section 124 extends through the opening 120 in the upper cap 108, the filter element 106, and the opening 118 in the lower cap 110 through the opening 120 in the upper cap 108, the filter a distance sufficient to permit a lock-nut 126 to be threadably attached thereon thereby securing the lower cap 110, the filter 106 and the upper cap 108 to the rod 122. The narrowed section 124 of the rod further carries a plurality of magnets 128 which are spaced from the upper cap 108 by a bushing 130 and are locked together by a nut 132.

Thus it can be seen that raising or lowering the rod 122, the cap members 108 and 110, and the filter 106 carried therebetween are also raised and lowered through the tubular housing extension 34.

A meshed frusto-conical shaped section 134 is secured between the filter element 106 and the lower cap 110. As the filter element 106 is lifted upwardly through the fluid, the weight of the fluid acting on the filter tends to wash accumulated foreign matter that has accumulated on the interior of the filter downwardly where it is collected by the member 134.

The filter housing 28 has a drain plug 136 which is provided for the purpose of removing sediment and other foreign matter that accumulates in the lower chamber section 68. The drain plug 136 permits removal of accumulated sediment while the fluid system is actively flowing.

It is to be understood that the tubular housing 34 has an inner diameter sufficient to permit the upper cap member 108 and lower cap member 110 to be removed upwardly as a unit with the filter element 106 when the filter element has to be cleaned or replaced. The housing 34 also is provided with a signt glass 140 which is preferably disposed at a height corresponding to a minimum fluid level in the system. This level is above the outlet 45 and preferably corresponds to the level of the overflow conduit 44.

Now as the invention has thus far been described, fluid is normally drawn from the interior of the reservoir 10 by the pump 14 and assisted by the impeller 64. The fluid is drawn through inlet passage 26 into the lower chamber section 68 by means of inlet opening 66. Fluid also is drawn into the upper portion of chamber 32 by way of vertical passages 69. The fluid from both the lower chamber section 68 and the upper portion of the filter chamber 32 flows axially into the filter element 106 through the apertures 117 in the lower cap member 110 and the apertures 116 in the upper cap member 108. The fluid is drawn radially outwardly in filtering relationship through the filter element 106 for discharge through the outlet 45.

The motor 54 rotates impeller at a speed sufficient that the normal level of the fluid in the filter device is maintained at a sufficient height to produce an overflow through the overflow conduit 44 back into reservoir 10. Thus air cannot be captured in the preferred filter element as the result of a reduced fluid level.

As the filter element 106 becomes clogged, it produces a pressure differential across the inlet passage 26 and the outlet 45. This pressure differential results in an increased inlet pressure which is reflected in the lower chamber section 68 and acts against the lower surface of the flange 94. This produces an upward force on carrier member 92 in opposition to the normal downward biasing of the spring 102. When the pressure has increased sufficiently that an upward force is created in excess of the reaction produced by the spring 102, the carrier 92 raises the lower cap member 110, the upper cap member 108 and the filter element 106 vertically upwardly until the lower cap member 110 clears the apertures 90 in the cylindrical member 80 to open a direct passage from the lower chamber section 68 to the discharge opening 45 and bypassing the filter element 106.

Thus it can be seen that it is preferable that the spring member 102 be chosen of a stiffness corresponding to a predetermined clogged condition of the filter element 106 so that when the filter element has reached this clogged condition, the carrier member is moved a vertical distance sufficient to permit fluid flow through the bypass passage.

The indicating apparatus 50 reflects the upward displacement of the filter members and comprises a knob member 142 threadably carried at the upper end of rod 122. The upper end of the tubular section 34 is provided with a cover member 144 having an air passage 146 which permits air movement into or out of the filter device to accommodate changing fluid levels. The cover 144 is provided with an axial vertical aperture 148 having an enlarged section 150. A pin member 152 axially slidably received by the bore 148 has a head 154 which seats against the shoulder defined by the bore 148 and the enlarged section 150. The knob 142 is adjusted at the end of the rod 122 such that it abuts the lower end of the pin 152 when the pin is in its lower position. An annular retainer 156 is disposed around the pin 152 with its upper end abutting the cover 144 and its lower end reacting against the retainer 156 so that the pin is normally urged toward its extreme downward position.

Figure 3:
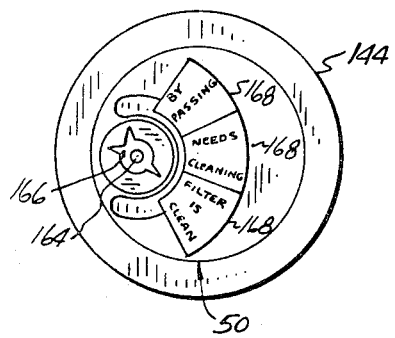
FIGURE 3 is a fragmentary view as seen substantially from lines 3—3 of FIGURE 1.

The retainer 156 is also provided with a radial slot 160 which is formed inwardly from its circumferential edge. The slot 160 engages an elongated actuating member 162 having a uniform twist and carried by a vertical pin 164 supported for rotation in the cap of 144. The upper end of the pin 164, as can best be seen in FIGURE 3, carries a pointer element 166 which traverses the upper surface of cap 144. The pointer 166 is associated with a plurality of indicia 168. Since the degree of rotation of the pin 164 corresponds to the vertical movement of the filter assembly and therefore the condition of the filter element 106, the indicia 168 correspond to this degree of rotation and visually indicate the condition of the filter element.

The cap 144 carries a downwardly depending guide pin 170 which registers in an opening 172 provided in the retainer 156 and functions to stabilize the retainer 156.

Normally when the filter elements 106 has become clogged to a degree requiring that it be removed for purposes of either cleaning or replacement, the cap 144 is removed while the fluid system continues to operate. The knob 142 is grasped to pull the filter element 106 vertically upwardly through the tubular extension 34 from within the chamber 32. This removal does not disturb the operation of the fluid system. The impeller 64 insures that any tendency of the fluid level to decrease to a height where air will be captured in the system as it discharges through the outlet 45 is completely eliminated. Furthermore, the impeller insures that the fluid system maintains a pressure level such that cavitation or the forming of vapor pockets is obviated.

It is apparent that although we have described but one embodiment of our invention, many changes can be made therein without departing from the spirit of the invention as expressed by the scope of the accompanying claims.

We claim:
1. In a fluid system having a fluid reservoir, a combination pump-filter device comprising;
  (a) a housing section having a fluid inlet in fluid communication with said reservoir and a fluid outlet;
  (b) said housing defining a chamber below the level of the fluid in said reservoir and disposed fluidly intermediate said fluid inlet and said fluid outlet;
  (c) said housing having a tubular section providing an upward vertical extension of said chamber, said upward extension terminating above the level of the fluid in said reservoir;
  (d) a filter assembly disposed in said chamber and removable therefrom upwardly through said tubular member; and
  (e) means including fluid pumping means supported intermediate said reservoir and said chamber to maintain the upper surface of said fluid in said chamber at a predetermined level above said outlet.

2. A pump-filter device as defined in claim 1, wherein said fluid pumping means includes a shaft supported for rotation, and vane elements secured to the free end of said shaft in an operative position intermediate said reservoir and said chamber.

3. A pump-filter device as defined in claim 2, including motor means for rotating said shaft.

4. A pump-filter as defined in claim 1, including pressure responsive means having a first surface exposed to the pressure of fluid on the inlet side of said filter assembly and having a surface opposite to said first surface exposed to the pressure of fluid on the outlet side of said filter assembly and movable in response to a predetermined increase in the pressure differential across said filter assembly to a position opening a bypass from said fluid inlet to said fluid outlet.

5. A pump-filtering device as defined in claim 1, including pressure responsive means having one side exposed to the pressure of fluid on the inlet side of said filter assembly and a second opposite side exposed to the pressure of fluid on the outlet side of said filter assembly and movable in response to a change in the pressure differential across the filter assembly, and means operably connected to said pressure responsive means to visually indicate the position of said pressure responsive means exteriorly of said filter device.

6. A pump-filter device as defined in claim 5, including means actuated by movement of said pressure responsive means to open a fluid passage from said fluid inlet directly to said outlet upon a predetermined variation in the pressure differential across said filter element.

7. A pump-filter device as defined in claim 1, wherein said filter assembly comprises;
  (a) a pair of spaced apart flange members and a cylindrical filter element disposed therebetween; and
  (b) means provided in said filter chamber defining a seat for one of said flange members, said means vertically slidably disposed within said filter chamber and movable in response to the filtering condition of said filter element between a first position associated with a first filter condition wherein the fluid is directed from said inlet through said filter element and to said outlet, and a second position associated with a second filter condition wherein the fluid is directed from said inlet to said outlet and bypassing said filter element.

8. A pump-filter device as defined in claim 7, including a vertical elongated stem member carried by said filter assembly, said stem member extending upwardly through said tubular member, and visual indicating means operably associated with the upper end of said stem and actuated by the movement of said stem to indicate the vertical position of said filter assembly.

9. A pump-filter device as defined in claim 7, wherein said seat defining means comprises;
   (a) an annular seat provided in said chamber;
   (b) a cylindrical member normally disposed on said seat;
   (c) guide means associated with said cylindrical member to permit vertical movement thereof toward and away from said seat in response to the variations in fluid pressure imposed on horizontal surfaces of said cylindrical member, said fluid pressure variations corresponding to a variable related to the filtering condition of said filter element; and
   (d) means carrying said filter element within said cylindrical member so that said filter element moves in combination with said cylindrical member in response to the variations of said fluid pressure.

10. A pump-filter device as defined in claim 9, including means operably connected to said flange members to visually indicate the vertical position of said filter element.

11. A pump-filter device as defined in claim 9, wherein said pump means are effective for maintaining said fluid at a predetermined level above said outlet and includes a shaft supported for rotation, and vane elements secured to the free end of said shaft in a position intermediate said inlet and said filter element.

12. A pump-filter device as defined in claim 11, including a second cylindrical filter element carried by said supporting means in coaxial relationship to said first filter element.

13. A pump-filter device as defined in claim 11, including drain means carried by said housing effective to permit removal of foreign particles from said housing while the fluid is flowing through said filter assembly.

14. A pump-filter device as defined in claim 11, including means carried by said supporting means for separating magnetically attractive particles from the system fluid.

15. A pump-filter device as defined in claim 11, and including means for visually observing the fluid level of said fluid system.

16. A pump-filter device as defined in claim 11, wherein said pumping means is effective for maintaining the system fluid at a predetermined level above said outlet and includes a shaft supported for rotation, and vane elements carried by the free end of said shaft in a position intermediate said inlet and said filter assembly.

17. A pump-filter device as defined in claim 1, wherein said filter assembly comprises;
   (a) a cylindrical figlter element; and
   (b) supporting means provided for said filter element, said supporting means vertically slidably disposed in said filter chamber and movable in response to the condition of said filter element between a first position associated with a first effective filtering condition of said filter element wherein the fluid from said inlet axially into said filter element, radially outwardly through said filter element and to said outlet, and a second position associated with a second effective filtering condition of said filter element wherein the fluid is directed from said inlet to said outlet and bypassing said filter element.

References Cited

UNITED STATES PATENTS

| | | | |
|---|---|---|---|
| 1,817,572 | 8/1931 | Linley et al. | 210—172 |
| 2,795,332 | 6/1957 | Burla | 210—172 X |
| 3,172,850 | 3/1965 | Englesberg et al. | 210—172 |
| 3,313,416 | 4/1967 | Rosaen | 210—223 X |

SAMIH N. ZAHARNA, *Primary Examiner.*

U.S. Cl. X.R.

210—95, 131, 223